United States Patent
Periorellis et al.

(10) Patent No.: US 11,080,159 B2
(45) Date of Patent: Aug. 3, 2021

(54) MONITOR-MINE-MANAGE CYCLE

(71) Applicant: Microsoft Technology Licensing, LLC, Redmond, WA (US)

(72) Inventors: Panos Periorellis, Aachen (DE); Eldar Akchurin, Aachen (DE); Joris Claessens, Tienen (BE); Ivo Jose Garcia dos Santos, Stolberg (DE); Oliver Nano, Aachen (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 502 days.

(21) Appl. No.: 16/136,952

(22) Filed: Sep. 20, 2018

(65) Prior Publication Data

US 2019/0034806 A1     Jan. 31, 2019

Related U.S. Application Data

(63) Continuation of application No. 13/734,961, filed on Jan. 5, 2013, now Pat. No. 10,095,978.

(51) Int. Cl.
*G06F 11/30* (2006.01)
*G06N 5/02* (2006.01)
*G06N 7/00* (2006.01)

(52) U.S. Cl.
CPC ...... *G06F 11/3006* (2013.01); *G06F 11/3082* (2013.01); *G06F 11/301* (2013.01);
(Continued)

(58) Field of Classification Search
CPC ...... G06N 5/02; G06N 7/005; G06F 11/3082; G06F 11/3006; G06F 11/301; G06F 2201/86
See application file for complete search history.

(56) References Cited

U.S. PATENT DOCUMENTS 10,324,773 B2 *   6/2019   Wing .................... G06F 1/30
2009/0164443 A1 * 6/2009   Ramos ................ G06F 16/21
2012/0131172 A1   5/2012   Falk et al.

OTHER PUBLICATIONS

Chen, Huamin et al.; Session-Based Overload Control in QoS-Aware Web Servers; 2002 IEEE Infocom; pp. 516-524. (Year: 2002).*

(Continued)

*Primary Examiner* — Stanley K. Hill
(74) *Attorney, Agent, or Firm* — Buckley, Maschoff & Talwalkar LLC (57) ABSTRACT

A monitor-mine-manage cycle is described, for example, for managing a data center, a manufacturing process, an engineering process or other processes. In various example, the following steps are performed as a continuous automated loop: receiving raw events from an observed system; monitoring the raw events and transforming them into complex events; mining the complex events and reasoning on results; making a set of proposed actions based on the mining; and managing the observed system by applying one or more of the proposed actions to the system. In various examples, the continuous automated loop proceeds while raw events are continuously received from the observed system and monitored. In some examples an application programming interface is described comprising programming statements which allow a user to implement a monitor-mine-manage loop.

20 Claims, 5 Drawing Sheets

(52) U.S. Cl.
CPC ............ *G06F 2201/86* (2013.01); *G06N 5/02* (2013.01); *G06N 7/005* (2013.01)

(56) References Cited

OTHER PUBLICATIONS

Pacifici, Giovanni et al.; Performance Management for Cluster-Based Web Services; IEEE Journal On Selected Areas in Communications, vol. 23, No. 12, Dec. 2005; pp. 2333-2343. (Year: 2005).*
Tsai, Chang-Hao et al.; Online Web Cluster Capacity Estimation and Its Application to Energy Conservation; IEEE Transactions On Parallel and Distributed Systems, vol. 18, No. 7, Jul. 2007; pp. 932-945. (Year: 2007).*
"Office Action Issued in European Patent Application No. 14702320.4", dated Dec. 21, 2018, 6 Pages.
Gu, Xiaohui et al., "Online Anomaly Prediction for Robust Cluster Systems", IEEE 25th International Conference on Data Engineering, Mar. 29, 2009, ISBN: 978-1-4244-3422-0, DOI: 10.1109/ICDE.2009.128 (pp. 1000-1011, 12 total pages).
"Office Action Issued in Indian Patent Application No. 3760/CHENP/2015", dated Jul. 27, 2020, 7 Pages.
"Office Action Issued in Brazil Patent Application No. BR112015015946-0", dated Feb. 12, 2020, 5 Pages.

* cited by examiner

MONITOR-MINE-MANAGE CYCLE

This is a continuation of co-pending prior U.S. patent application Ser. No. 13/734,961, entitled "MONITOR-MINE-MANAGE CYCLE" and filed on Jan. 5, 2013, the entire contents of which are incorporated herein by reference for all purposes.

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Monitoring a data stream of observations from a process and seeking to use the observations to manage the process is useful in many application domains. For example, data center management, manufacturing process control, engineering process control, inventory management, and others.

Typically, monitoring an infrastructure, understanding the observations made and deciding how to adapt it or reconfigure it accordingly, can be a lengthy and costly process. Navigating through log files and traces in order to carry out root cause analysis of a failure can be long and tedious. Even when administrators use tooling, a lot of the times one has to alternate manually between the monitoring domain and the mining domain in order to transfer the data collected in logs and traces, run them through some mining algorithms, decide how to interpret that mining and react to the results observed. It is also typically the case that management actions are made based on past monitored observations, rather than the actual real-time state of the system.

The advent of the Digital Age has made large-scale data acquisition and online processing a crucial component of modern systems. A Data Stream Management System (DSMS) enables applications to issue long-running continuous queries that efficiently monitor and process streams of data in real times. DSMS are used for data processing in a broad range of applications, e.g. algorithmic stock trading.

Some previous approaches have sought to perform the processes of monitoring, managing and offline mining (in this order). Data is monitored to detect interesting patterns that are used to manage and perform business actions. The raw data is aggregated and stored offline. The historical data is then mined to determine new patterns (or modifications to existing patterns) that are fed back to the monitoring phase. Historical, offline data mining can reveal new chart patterns or refinements of existing patterns. This approach involves some manual steps and is therefore slow. In a world where corporations want faster insight into their data, this manual approach is not enough.

The embodiments described below are not limited to implementations which solve any or all of the disadvantages of known systems which monitor a data stream of observations from a process.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A monitor-mine-manage cycle is described, for example, for managing a data center, a manufacturing process, an engineering process or other processes. In various examples, the following steps are performed as a continuous automated loop: receiving raw events from an observed system; monitoring the raw events by transforming them into complex events; mining the complex events and reasoning on results; making a set of proposed actions based on the mining; and managing the observed system by applying one or more of the proposed actions to the system. In various examples, the continuous automated loop proceeds while raw events are continuously received from the observed system and monitored. In some examples an application programming interface is described comprising programming statements which allow a user to implement a monitor-mine-manage loop. Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing system, the system described is provided as an example and not a limitation. As those skilled in the art will appreciate, the present examples are suitable for application in a variety of different types of computing systems.

Some of the embodiments refer to a computer-implemented method, wherein the following steps are performed as a continuous automated loop. Raw events are received from an observed system. The raw events are monitored and transformed into complex events. The complex events are mined and a reasoning is performed on results. Then a set of proposed actions is made based on the mining. The observed system is managed by applying the proposed actions to the system, while raw events are continuously received from the observed system and monitored.

The term "continuous automated loop" means that the output of one method step is automatically and cyclically used as the input for the next method step and so on.

In some of the embodiments, the steps of monitoring, mining and managing are performed in real-time or near real-time (as fast as possible) such that an input to a step is based on output of a previous step with little or no time delay.

In some of the embodiments, the steps of the loop above are performed in an event-driven or event-based manner. The raw events are received as streams and the transformation from raw events into complex events is performed by event stream processing technology. In some embodiments, the input and output of all method steps, such as mining results and mining input data, etc. are modeled as events.

In some of the embodiments, a data-stream management system (DSMS) is used to perform the method. A DSMS is a computer program that controls the maintenance and querying of data in data streams. A feature of a DSMS is the ability to execute a continuous query against a data stream. The use of a DSMS to manage a data stream is roughly analogous to the use of a database management system (DBMS) to manage a conventional database. A conventional database query executes once and returns a set of results for a given point in time. In contrast, a continuous query continues to execute over time, as new data enters the stream. The results of the continuous query are updated as new data appears.

Event stream processing (ESP) is a set of technologies designed to assist the construction of event-driven information systems. ESP technologies include event visualization, event databases, event-driven middleware, and event processing languages, or complex event processing (CEP). In practice, the terms ESP and CEP are often used interchangeably.

The term (data) "mining" refers to a process that attempts to discover patterns in large data sets. It utilizes methods at the intersection of artificial intelligence, machine learning, statistics, and database systems. The overall goal of the (data) mining process is to extract information from a data set and transform it into an understandable structure for further use.

In some of the embodiments, Microsoft StreamInsight™ as a data-stream management system, is used for the monitoring. StreamInsight™ is a platform that can be used to develop and deploy complex event processing (CEP) applications. Its high-throughput stream processing architecture enable a user to implement robust and efficient event processing applications. Event stream sources typically include data from manufacturing applications, financial trading applications, Web analytics, and operational analytics. By using StreamInsight™, CEP applications can be developed that derive business value from this raw data by reducing the cost of extracting, analyzing, and correlating the data; and by allowing to monitor, manage, and mine the data for conditions, opportunities, and defects almost instantly.

By using StreamInsight™ in integration with other technologies to develop CEP applications, data can be monitored from multiple sources for meaningful patterns, trends, exceptions, and opportunities. Data can be analyzed and correlated incrementally while the data is in-flight—that is, without first storing it—yielding very low latency. Seemingly unrelated events can be aggregated from multiple sources and perform highly complex analyses over time.

However, it is not essential to use StreamInsight™. Any data stream management system which is able to monitor a data stream as described herein may be used.

The loop described above comprises three main phases: those of monitoring, mining and managing (3M) systems. In some of the embodiments, these phases are automated so that the output of one phase becomes input to the next phase creating a continuous loop. Within this loop, monitoring becomes the input to mining techniques for understanding one's system and gaining insight as well as reasoning about its state. The decisions of the mining process serve as input to the management process that reacts in order to maintain the system healthy and operational. This potentially can lead to a self-healing system since observations about faults can be used to reason and react accordingly.

In some of the embodiments, a raw event is represented by a (change in a) log or traces. In the monitoring process, the raw events are transformed, for example aggregated, and processed in order to create complex events from the raw events. In other embodiments, a raw event is represented by individual sensor readings or user actions, such as web clicks.

In the mining process, the complex events produced in the monitoring step are analyzed by applying specific techniques and algorithms. Then, reasoning is performed on the results. The outcome of the mining process is a set of proposed actions, recommendations and decisions related to the system which is being observed. In some of the embodiments, the mining process is performed by complex processing such as pattern recognition, statistical analysis or machine learning.

The mining process is followed by a managing process which receives the output of the mining process as input. Managing is the process which is responsible for applying decisions or proposals from a previous step to the actual system while the system is still continuously monitored.

In some of the embodiments, the managing includes performing repairs, updates, backups and configurations.

In some of the embodiments, the managing includes deploying and removing a server from a set of servers that serve user requests. In some of the embodiments, the managing is based on static constraints. In some of the embodiments the static constraints are costs involved with the proposed actions to be performed. In some of the embodiments, the static constraints are at least one of the maximum number of servers deployed, the maximum number of electricity spent per day, the maximum number of cash spent to have the servers deployed.

In some of the embodiments, streaming is performed by a client-server approach in which a streaming engine is located on the observed system and a streaming client is located on a monitoring system. In other embodiments, the streaming engine is in a cloud, while the event sources are located on the observed system.

In some of the embodiments, the 3M cycle described above is used to build a self-managing system based on the automation of the three phases, the little delay between the phases and the small reaction times. Self-management is a process by which computer systems manage their own operation without human intervention. In practice, human intervention is often still needed. Therefore, in some embodiments, human intervention is minimized or the whole task is made easier for a human. For example, a human is needed to confirm or commit a set of changes suggested by a system. Self-management technologies are expected to pervade the next generation of network management systems. The growing complexity of modern networked computer systems is currently the biggest limiting factor in their expansion. The increasing heterogeneity of big corporate computer systems, the inclusion of mobile computing devices, and the combination of different networking technologies like WLAN, cellular phone networks, and mobile ad hoc networks make the conventional, manual management very difficult, time-consuming, and error-prone. "Self-management" also includes aspects of "self-configuration" which refers to automatic configuration of components, "self-healing" which refers to automatic discovery, and correction of faults; automatically applying all actions to bring a system back to normal operation and "self-optimization" which refers to automatic monitoring and control of resources to ensure the optimal functioning with respect to the defined requirements.

A user wishing now to implement a 3M cycle as described above has to resort to conventional programming languages which do not provide special support for implementing the 3M cycle described above. However, in order to make it easier for a user to implement a 3M cycle, some of the embodiments refer to an application programming interface comprising programming commands which allow a user to implement a monitor-mine-manage loop. The application programming interface comprises the following entities: a data source entity which enables the user to express the sources of the monitoring data to be observed; a feature extraction entity which allows a user to express the set of features to be extracted from the raw data; a model application entity which allows a user to apply models to the complex events created from the feature extraction; and an actions entity which allows a user to describe management operations on the observed infrastructure. In some of the embodiments, the programming statements are declarative constructs. In declarative programming, the logic of a computation is expressed without describing its control flow. Programming languages applying this style describe what the program accomplishes, rather than describing how to go about accomplishing it (the how is left up to the language's implementation). This is in contrast with imperative programming, in which algorithms are implemented in terms of explicit steps.

In some of the embodiments, a monitoring statement takes as input a type of the component it monitors.

In some of the embodiments, the programming statements comprise a programming statement that associates the management operations with results from feature extraction.

Returning now to FIG. 1, which illustrates a monitor-mine-manage loop in an abstract manner. A system 1 is observed and raw events are generated from it which are subsequently monitored and transformed into complex events. A model which comprises prior knowledge and goals is compared with the complex events in a mining process 3 and recommendations, inference and decisions are derived by the mining process. (A goal, for instance, may be an SLA that says that a system is to service 1000 customer requests per second or that a system is not to spend more than X amount of energy while operational.) These recommendations, inference and decisions are input into a management element 4 which compares the recommendations, inference and decisions with static constraints. In the example shown, the static constraints are the costs that are involved in the performance of the individual actions such as repairs and configurations that are finally performed on the observed system. The whole cycle is event-driven and the cycle is performed in real-time or near real-time and not on historical data. The action performed on the observed system is based on recent event(s). The steps are automatically performed one after the other without manual or human intervention.

Figure 2:
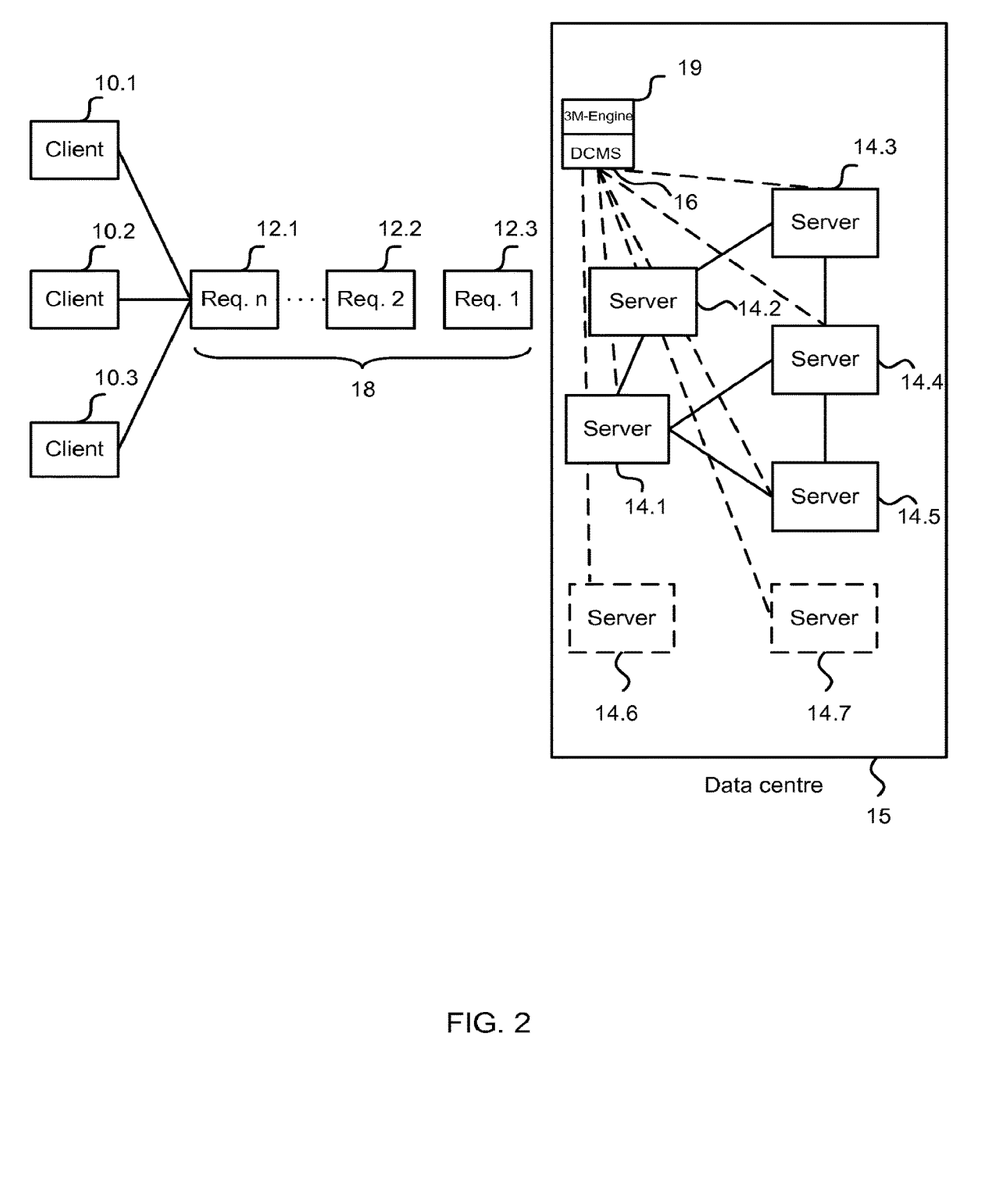
FIG. 2 schematically shows a data centre having to deal with a variable load over the day.

FIG. 2 schematically illustrates an exemplary client-server structure in which a number of clients 10.1-10.3 send requests 12.1-12.3 to servers 14.1-14.5 of a data centre 15 which receives the requests 12, processes them and sends a response back to the requesting client 10. The data centre 15 is a facility used to house the servers 14 and associated components, such as telecommunications (switches, routers, etc.) and storage systems. It includes redundant or backup power supplies, redundant data communications connections, environmental controls (e.g., air conditioning, fire suppression) and security devices. The data centre 15 also includes a data centre management system 16 on which applications run that monitor the current load of the data centre 15 and other parameters. The data centre management system 16 manages the data centre 15 and is in connection with a monitor-mine-manage engine 19 which provides monitoring, mining and management functionality as described in this specification. Usually, the load of the data centre 15 varies over the time of the day. For example, the load is smaller during night than during daytime. There are peak hours with more requests (increased load) and hours with fewer requests (less load). During peak hours, additional servers 14.6, 14.7 are needed to fulfill the service level agreement under the increased load. Each server 14 has a cost associated with it. Since the load varies over the day and the number of servers 14 available to process the requests also varies, the queue of client requests is also variable.

Figure 3:
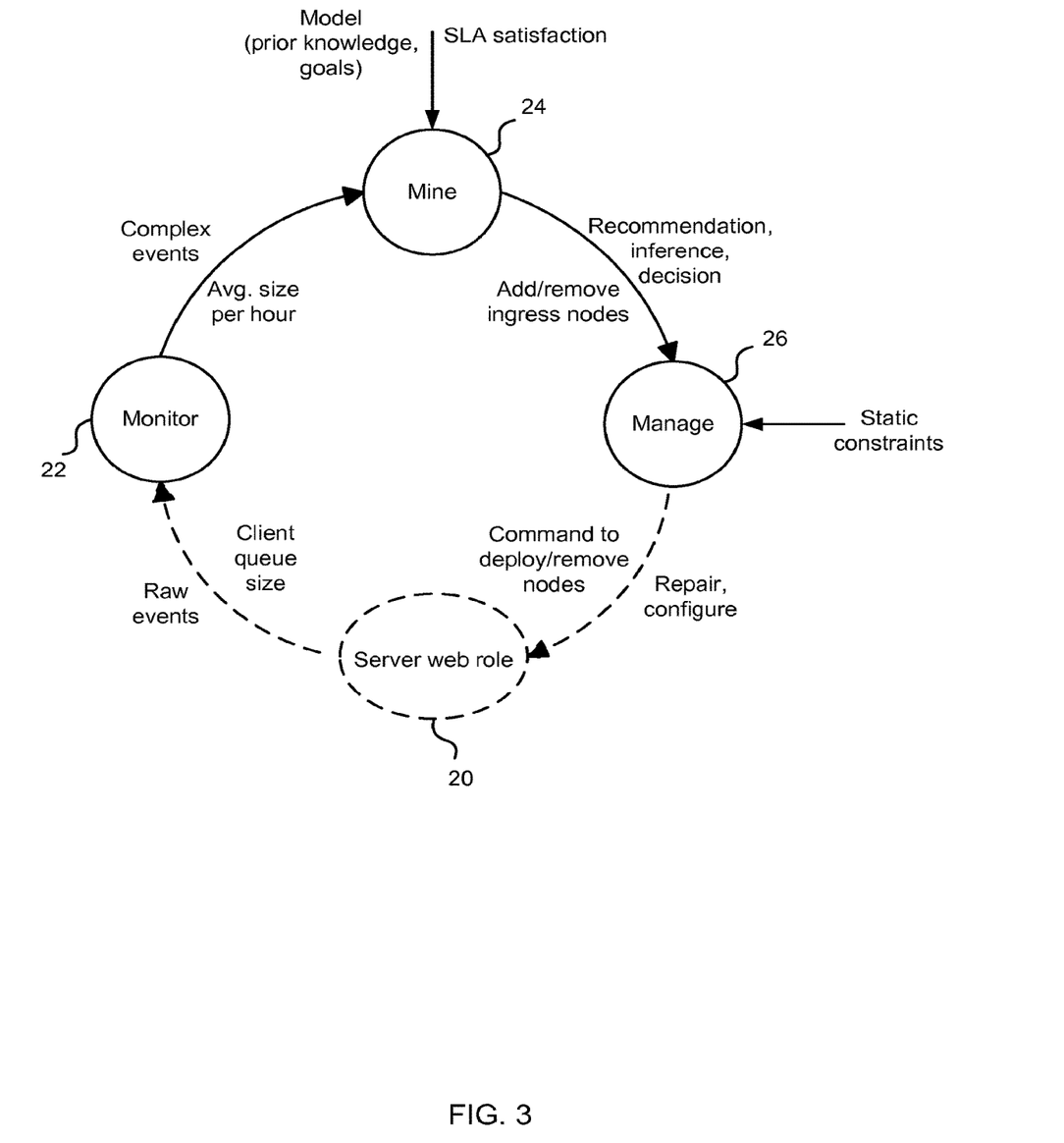
FIG. 3 shows a monitor-manage-mine loop which is applied to the data centre optimization scenario of FIG. 2.

FIG. 3 shows how the monitor-mine-manage loop is applied to the data centre scenario described in FIG. 2. By means of the 3M loop, it is tried to optimize over the time of the day the number of servers 14 deployed according to some service level agreement (SLA) that defines the quality of service offered. An SLA is a part of a service contract where the level of service is formally defined. In practice, the term SLA is sometimes used to refer to the contracted delivery time (of the service or performance). Data centre service providers will commonly include service level agreements within the terms of their contracts with customers to define the level(s) of service being sold in plain language terms. In this case the SLA will typically have a technical definition in terms of mean time between failures (MTBF), mean time to repair or mean time to recovery (MTTR); various data rates; throughput; jitter; or similar measurable details. In the present example, an SLA between the clients and the data centre provider defines that the agreement is fulfilled if each client 10 is served within one second at all times.

In the present example, the observed system 20 is the data centre 15 with the servers 14 on which cloud computing applications are running. The cloud computing applications may be of any suitable type. The client requests received by the observed system 20 are monitored. In the example shown, the raw events are the size of the queue, more precisely the fluctuation of the size of the queue over time. The complex events are averages over time, in the example shown over a period of ten minutes. A mining process 24 is performed in which a Bayesian model is used which predicts queue sizes given the averages as well as the time of the day. The model uses prior knowledge such as historical/empirical data as well as the input from the monitoring process 24 to predict how queue size will fluctuate. At the same time it takes into consideration the SLA that requires that all clients are to be served within one second. The mining process 24 outputs recommendations regarding the number of servers to be deployed at any one time in order for the SLA to be satisfied. The recommendation is passed to a managing process 26 that interacts with the observed system 20 and deploys or removes servers according to the recommendations it receives while the monitoring process 22 continues to monitor the queue sizes. This continuous loop ensures that the SLA is satisfied and the costs optimized. The monitoring process 22 and the managing process 26 encapsulate those components that interact with the observed system for which the loop is applied, while the mining process 24 is carrying out the analytics. Mining can be smarter and more complex depending on the scenario. Algorithms like machine learning, pattern recognition and statistics play a major role while constraint reasoning (for making hard decisions on what will happen and automating the managing process) can also be part of the mining process.

The loop described with reference to FIGS. 2 and 3 is event-driven and the phases are directly performed one after the other such that the action performed on the system is based on events that occurred only very recently.

The loop as presented in FIGS. 2 and 3 may be considered to be an integration between complex event processing, modeling tools and management infrastructure. The monitoring can be performed by applications such as Reactive Framework™ and StreamInsight™ or any other monitoring application which enables complex event processing. The mining process 24 may be implemented using applications such as, Solver Foundation™ and DMX™ or any other mining applications. The management process 26 may be implemented using applications such as Orchestrator™, BizTalk™, Hydration™, Workflow Foundation™ or any other management applications.

Figure 1:
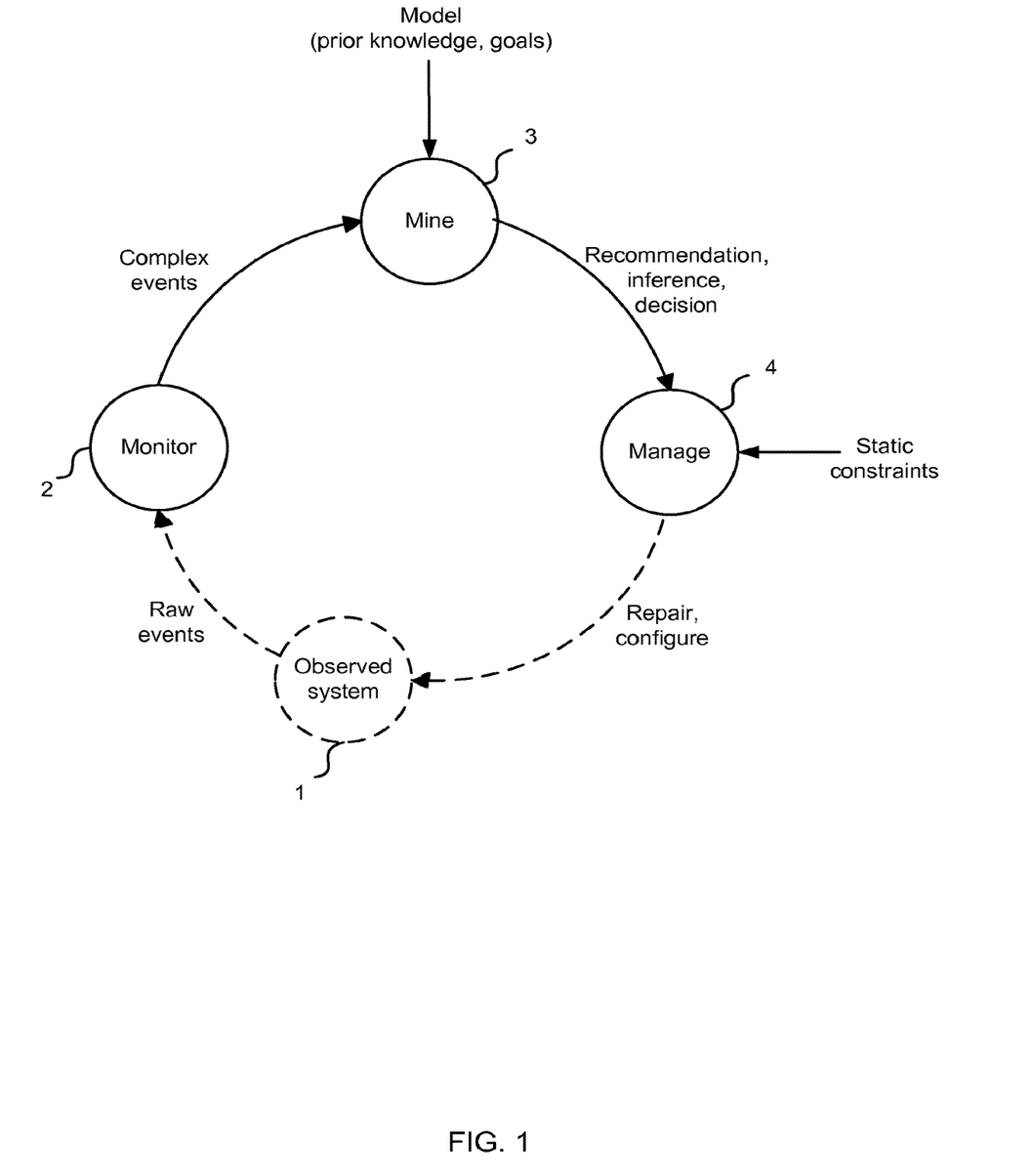
FIG. 1 shows a monitor-manage-mine loop in an abstract manner in which the individual steps are executed in real-time or near real-time.
Figure 4:
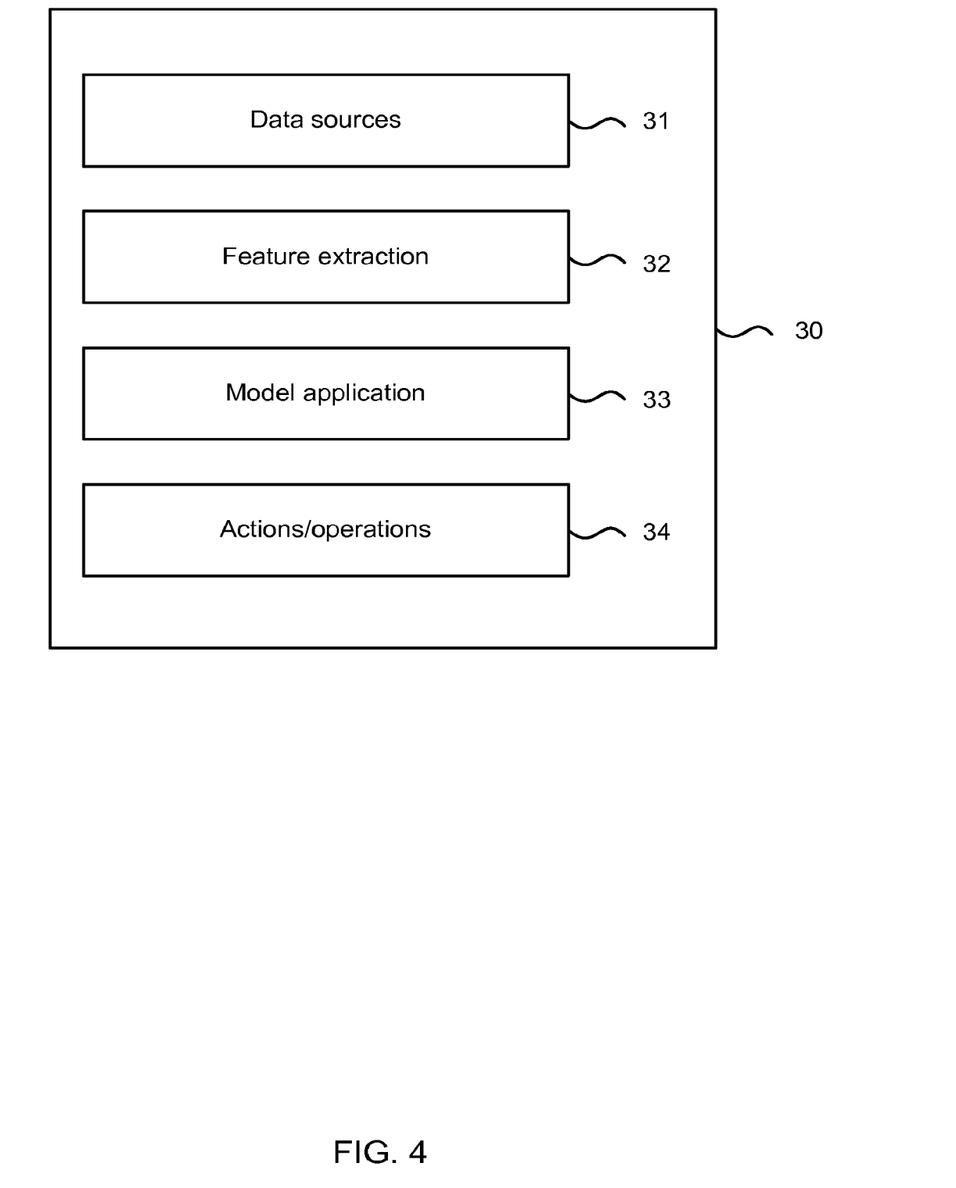
FIG. 4 illustrates entities of an API for implementing the concepts described in FIGS. 1-3.

FIG. 4 schematically illustrates Application Programming Interface 30 and its entities that enable a user to efficiently program in a unified way the concepts described with regard to FIGS. 1-3. The API contains declarative language constructs (programming statements, programming commands, programming interface statements) to develop and execute a monitor-mine-manage cycle.

The API 30 contains a data source entity 31 which enables a user to express what the sources of the monitoring are that are observed. In other words, the entity allows a user to specify where raw events are coming from and any initial processing that is applied to them.

The API 30 also contains a feature extraction entity 32. The API 30 offers declarative elements to allow a user to express the set of features to be extracted from the raw data coming in from data sources.

Furthermore, the API 30 contains a model application entity 33 which offers declarative elements to allow users to apply models to the complex event data created from the earlier filtering process (feature extraction).

Finally, the API 30 contains an actions/operations entity 34 which describes management operations on the observed infrastructure (based on the results of the previous step). The management infrastructure is capable of orchestrating the decision/recommendation received.

The code samples below are illustrative lines of code for implementing the monitor-manage-mine loop in the data centre optimization embodiment as shown in FIGS. 2 and 3.

1. Monitoring

A monitoring statement takes as input the type of component it monitors (in this case the client queue information). The following is a declarative monitoring statement using StreamInsight™:

```
MonitoringStatement<ClientQueueInformation>monitoringStatement
= new MonitoringStatement<ClientQueueInformation>(
    (rawEvents) => from e in rawEvents.HoppingWindow(
        TimeSpan.FromMinutes(60),
        TimeSpan.FromMinutes(60))
    select e.MyAggregationOperator( ));
```

The above lines initialize the monitoring step with a type ClientQueueInformation. Internally following this line the StreamInsight™ engine will deploy the query i.e. start observing (via specific objects called observers) events from the queue and initialize all related input/output network adapters of type ClientQueueInformation. It also takes all events within hourly time windows and apply some aggregation. It is assumed that StreamInsight™ will already be deployed and running. The above statement is setting up the monitoring aspect.

2. Mining

The next line analyses the raw pieces of information coming from the client queue.

var decision=from e in monitoringStatement.Stream
select e.RunInferModel(InferenceModel, SLA));

The aggregated events coming from the monitoring state are taken as input and are sent to an inference model that takes as input also a Bayesian model (that predicts client request fluctuations) and an object that captures the SLA. The line "select e.RunInferFromModel(InferenceModel, SLA)" is where the mining takes place. The output of this is a deploy/remove decision. Based on this decision, the server deployment will be managed on the system. Further algorithms can be included that carry out complex processing on the incoming event stream.

The output of the above lines is a decision stream that (in this model) represents the decision the inference model makes regarding deployment and removal of servers.

3. Managing

Finally, the reaction or management part can be expressed as in the lines below:

ManagementOperation managementOperation1=new ManagementOperation("Server Deployment", typeof(DeployServerOperation));

ManagementOperation managementOperation2=new ManagementOperation("Server Removal", typeof(RemoveServerOperation));

The typeof(RemoveServerOperation) and typeof(DeployServerOperation) parameters capture the actual code that is executed. This code interacts with the data centre configuration manager 16 and performs the actual management operations on behalf of the 3M engine 19.

managementOperation1.TriggeredBy(from e in decision.Stream where e.decision=="Deploy" select e);

managementOperation2.TriggeredBy(from e in decision.Stream where e.decision=="Remove" select e);

These last two lines link the management operations with specific results expected from the evaluation of the mining process. So, managementOperation1 is triggered when a decision is "deploy" while managementOperation2 is triggered when the decision is "removal".

The above set of lines may be used to create a monitor-mine-manage loop based on event processing, mining and management operations using a declarative language approach. More management operations can be added that are triggered as part of the monitoring statement or monitoring statements can be added.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units.

Figure 5:
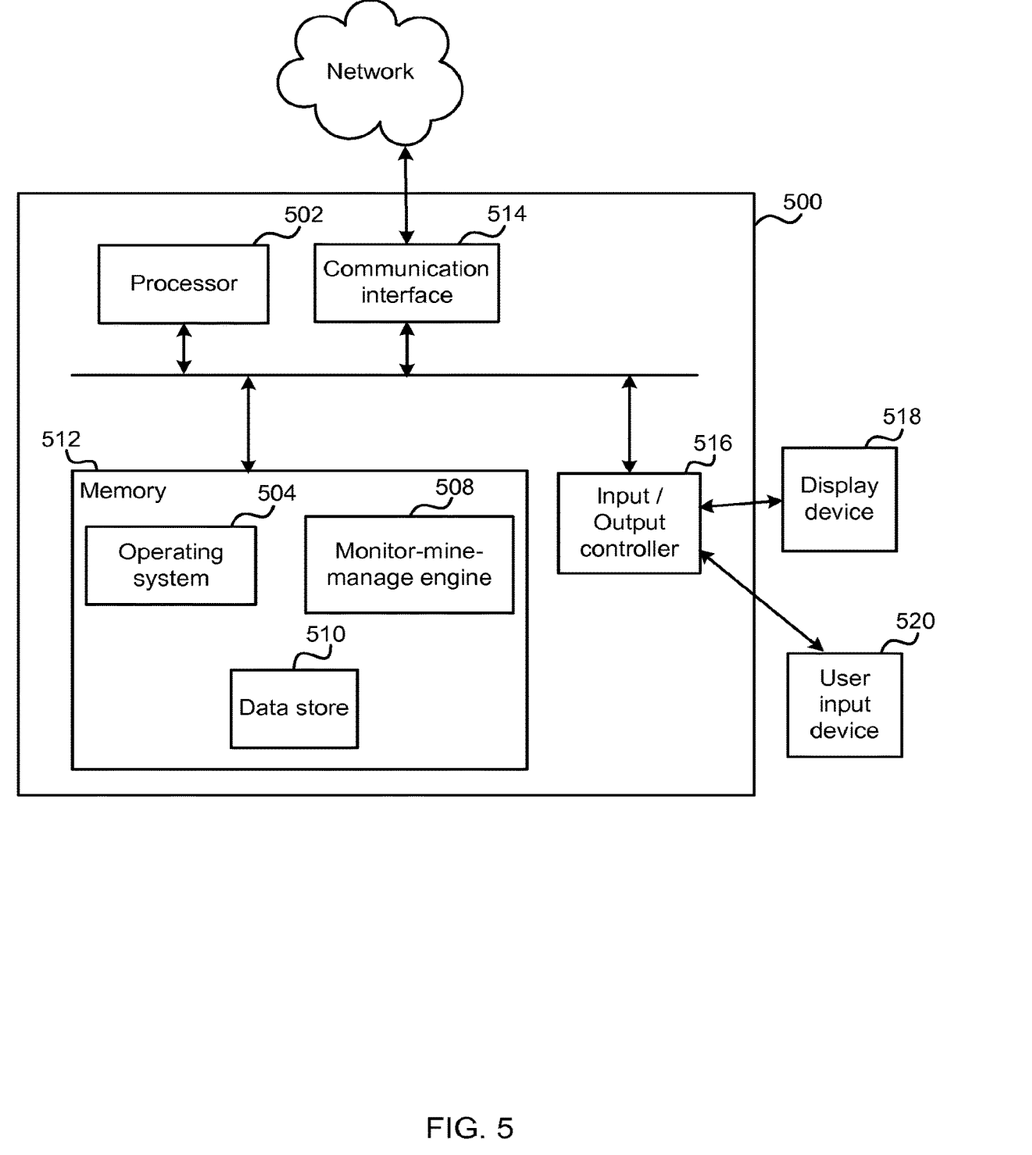
FIG. 5 illustrates an exemplary computing-based device in which embodiments of a monitor-mine-manage system may be implemented.

FIG. 5 illustrates various components of an exemplary computing-based device 500 which may be implemented as any form of a computing and/or electronic device, and in which embodiments of a monitor-mine-manage system may be implemented.

Computing-based device 500 comprises one or more processors 502 which may be microprocessors, controllers or any other suitable type of processors for processing computer executable instructions to control the operation of the device in order to monitor a data stream of observations, observed from another entity, mine information from the observations, and manage the other entity using the mined information. In some examples, for example where a system on a chip architecture is used, the processors 502 may include one or more fixed function blocks (also referred to as accelerators) which implement a part of the method of a monitor-mine-manage cycle in hardware (rather than software or firmware). Platform software comprising an operating system 504 or any other suitable platform software may be provided at the computing-based device. A monitor-mine-manage engine 508 is provided which is able to implement a monitor-mine-manage cycle as described herein. A data store 510 is provided which may store observations from a data stream, mined patterns and other complex event information from the data stream, management instructions, service level agreements, user configurable parameters, other parameters, or other information.

The computer executable instructions may be provided using any computer-readable media that is accessible by computing based device 500. Computer-readable media may include, for example, computer storage media such as memory 500 and communications media. Computer storage media, such as memory 512, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 512) is shown within the computing-based device 500 it will be appreciated that the storage may be distributed or located remotely and accessed via a network or other communication link (e.g. using communication interface 514).

The computing-based device 500 also comprises an input/output controller 516 arranged to output display information to a display device 518 which may be separate from or integral to the computing-based device 500. The display information may provide a graphical user interface. The input/output controller 516 is also arranged to receive and process input from one or more devices, such as a user input device 520 (e.g. a mouse, keyboard, camera, microphone or other sensor). In some examples the user input device 520 may detect voice input, user gestures or other user actions and may provide a natural user interface (NUI). This user input may be used to control the monitor-mine-manage engine, to set parameter values, to view results, to input service level agreements and for other purposes. In an embodiment the display device 518 may also act as the user input device 520 if it is a touch sensitive display device. The input/output controller 516 may also output data to devices other than the display device, e.g. a locally connected printing device.

The input/output controller 516, display device 518 and optionally the user input device 520 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
   monitoring a client request queue size of an observed system over time;
   predicting a future client request queue size based on the monitored client request queue size;
   determining a number of servers to be deployed in the observed system at a future time based on the predicted future client request queue size and a service level agreement associated with the observed system; and
   deploying a server to the observed system or removing a server from the observed system based on the determined number of servers, while continuing to monitor the client request queue size of the observed system over time.

2. A computer-implemented method according to claim 1, wherein predicting the future client request queue size comprises detecting a pattern in the client request queue size over time.

3. A computer-implemented method according to claim 2, wherein determining the number of servers is based on the detected pattern.

4. A computer-implemented method according to claim 3, wherein determining the number of servers comprises determining whether the detected pattern is indicative of fulfillment of the service level agreement.

5. A computer-implemented method according to claim 4, wherein determining the number of servers is based on a cost associated with server deployment.

6. A computer-implemented method according to claim 1, wherein determining the number of servers comprises determining compliance with one or more measurable details of the service level agreement.

7. A computer-implemented method according to claim 1, wherein monitoring the client request queue size comprises monitoring a plurality of events indicative of the client request queue size.

8. A computer-implemented method according to claim 7, wherein monitoring the client request queue size comprises:
   extracting one or more features from the plurality of events; and
   aggregating the one or more features into one or more other events indicative of the client request queue size over time.

9. A system comprising:
   a data center comprising one or more application servers, a monitoring system and a management system,
   the monitoring system operable to:
      monitor a client request queue size of the data center over time;
      predict a future client request queue size based on the monitored client request queue size;
      determine a number of servers to be deployed in the data center at a future time based on the predicted future client request queue size and a service level agreement associated with the data center, while continuing to monitor the client request queue size of the data center over time; and
      output a recommendation to the management system, the recommendation comprising the number of application servers to be deployed in the data center at the future time, while continuing to monitor the client request queue size of the data center over time; and
   the management system operable to:
      deploy an application server to the data center or remove an application server from the data center based on the recommendation.

10. A system according to claim 9, wherein prediction of the future client request queue size comprises detection of a pattern in the client request queue size over time.

11. A system according to claim 10, wherein determination of the number of servers is based on the detected pattern.

12. A system according to claim 11, wherein determination of the number of servers comprises determination of whether the detected pattern is indicative of fulfillment of the service level agreement.

13. A system according to claim 12, wherein determination of the number of servers is based on a cost associated with server deployment.

14. A system according to claim 9, wherein determination of the number of servers comprises determining compliance with one or more measurable details of the service level agreement.

15. A system according to claim 9, wherein monitoring of the client request queue size comprises monitoring of a plurality of events indicative of the client request queue size.

16. A system according to claim 15, wherein monitoring of the client request queue size comprises:
   extraction of one or more features from the plurality of events; and
   aggregation of the one or more features into one or more other events indicative of the client request queue size over time.

17. A computer-implemented system to:
   monitor a client request queue size of the observed system over time;
   determine a number of servers to be deployed in the observed system at a future time based on the monitored client request queue size and a service level agreement associated with the observed system;
   determine a recommendation comprising the number of servers to be deployed in the observed system; and
   configure one or more servers of the observed system based on the recommendation, while continuing to monitor the client request queue size of the observed system over time.

18. A system according to claim 17, wherein prediction of the future client request queue size comprises detection of a pattern in the client request queue size over time, and wherein determination of the number of servers is based on the detected pattern.

19. A system according to claim 18, wherein determination of the number of servers comprises determination of whether the detected pattern is indicative of fulfillment of the service level agreement.

20. A system according to claim 17, wherein monitoring of the client request queue size comprises:
   monitoring of a plurality of events indicative of the client request queue size;
   extraction of one or more features from the plurality of events; and
   aggregation of the one or more features into one or more other events indicative of the client request queue size over time.

* * * * *